(12) United States Patent  
Giese et al.

(10) Patent No.: US 7,410,182 B1
(45) Date of Patent: Aug. 12, 2008

(54) CONTROL ARM SUSPENSION SYSTEM FOR A VEHICLE

(75) Inventors: Tim Giese, Roseau, MN (US); Richard Harold Bates, Badger, MN (US)

(73) Assignee: Polaris Industries Inc., Medina, MN (US)

( * ) Notice: Subject to any disclaimer, the term of this patent is extended or adjusted under 35 U.S.C. 154(b) by 446 days.

(21) Appl. No.: 11/063,086

(22) Filed: Feb. 22, 2005

(51) Int. Cl.
*B60M 27/02* (2006.01)
*B60G 3/18* (2006.01)

(52) U.S. Cl. .............................. 280/124.135; 180/190; 280/89; 280/93.512; 280/124.136; 280/124.138

(58) Field of Classification Search .......... 280/124.135, 280/124.136, 124.138, 93.512, 124.143, 280/124.139, 89, 89.1, 89.12; 180/190, 191, 180/192, 193
See application file for complete search history.

(56) References Cited

U.S. PATENT DOCUMENTS

| | | | | |
|---|---|---|---|---|
| 5,029,664 | A | 7/1991 | Zulawski | 180/190 |
| 5,038,882 | A | 8/1991 | Zulawski | 180/190 |
| 6,499,551 | B2 * | 12/2002 | Karpik | 180/190 |
| 6,619,417 | B2 | 9/2003 | Lemieux | 180/182 |
| 6,655,487 | B2 | 12/2003 | Mallette et al. | 180/190 |
| 6,708,791 | B2 * | 3/2004 | Alexander | 180/182 |
| 2004/0026146 | A1 | 2/2004 | Mallette et al. | 180/183 |

* cited by examiner

*Primary Examiner*—Eric Culbreth
(74) *Attorney, Agent, or Firm*—Baker & Daniels LLP (57) ABSTRACT

A vehicle suspension system including control arms and a spindle. The suspensions of the invention use control arms pivotably and rotatably coupled to a spindle to improve the structural and performance characteristics of the suspension system.

26 Claims, 7 Drawing Sheets

CONTROL ARM SUSPENSION SYSTEM FOR A VEHICLE

FIELD

Embodiments of the invention relate to vehicle suspensions using control arms and a spindle coupled to the control arms.

BACKGROUND SECTION

Many vehicles have independent front suspension systems ("IFS"). Independent front suspension systems have separate elements that connect each of the front ground engaging components (i.e., tires, skis) of the vehicle to the frame or chassis of the vehicle. In this way, each of the front ground engaging component can move independently of the other.

A common form of IFS has two essentially parallel control arms. The control arms may be connected via pivoting connections to a spindle housing or via pivoting and rotating connections directly to a spindle. The spindle rotates to allow rotation of the ground engaging component and steering of the vehicle. In the case of an IFS with spindle housings the spindle usually rotates within the spindle housing.

BRIEF SUMMARY OF THE INVENTION

One embodiment of the present invention provides a suspension system for a vehicle having an upper control arm connected to a frame of the vehicle, a lower control arm also connected to the frame and a rotatable steering spindle, the spindle attachable to a ground engaging component upon which the vehicle rides, the rotation of the steering spindle for steering the vehicle. This embodiment may also include an upper coupling that pivotably and rotatably connects the spindle to the upper control arm and a lower coupling that pivotably and rotatably connects the spindle to the lower control arm, the spindle passing through the lower coupling.

Another embodiment of the present invention provides a suspension system for a vehicle having an upper control arm connected to a frame of the vehicle, a lower control arm also connected to the frame and a rotatable steering spindle, the spindle attachable to a ground engaging component upon which the vehicle rides, the rotation of the steering spindle for steering the vehicle. This embodiment may also include an upper coupling that pivotably and rotatably connects the spindle to the upper control arm and a lower coupling that pivotably and rotatably connects the spindle to the lower control arm, the spindle passing through the lower coupling. The lower coupling of this embodiment is a ball joint having an inner bearing race and an outer bearing race. The spindle of this embodiment passes through the inner bearing race and is rotatable and pivotable within the lower coupling.

Another embodiment of the present invention provides a suspension system for a vehicle having an upper control arm connected to a frame of the vehicle, a lower control arm also connected to the frame and a rotatable steering spindle, the spindle attachable to a ground engaging component upon which the vehicle rides, the rotation of the steering spindle for steering the vehicle. This embodiment may also include an upper coupling that pivotably and rotatably connects the spindle to the upper control arm and a lower coupling that pivotably and rotatably connects the spindle to the lower control arm, the spindle passing through the lower coupling. In this embodiment the upper control arm has a U-shaped perimeter when viewed from above, and the upper coupling is within the U-shaped perimeter of the upper control arm.

Another embodiment of the present invention provides a suspension system for a vehicle having an upper control arm connected to a frame of the vehicle, a lower control arm also connected to the frame and a rotatable steering spindle, the spindle attachable to a ground engaging component upon which the vehicle rides, the rotation of the steering spindle for steering the vehicle. This embodiment may also include an upper coupling that pivotably and rotatably connects the spindle to the upper control arm and a lower coupling that pivotably and rotatably connects the spindle to the lower control arm, the spindle passing through the lower coupling. In this embodiment the spindle further has an attachment point for attaching a ground engaging component upon which the vehicle rides. The aspect ratio of the spindle of this embodiment, defined as the distance between the lower coupling and the attachment point for the ground engaging component divided by the distance between the upper coupling and lower coupling, is greater than 1.0.

Another embodiment of the present invention provides a suspension system for a vehicle having an upper control arm operably connected to a frame of the vehicle, a lower control arm operably connected to a frame of the vehicle and a spindle pivotably and rotatably connected to the upper control arm by an upper coupling and pivotably and rotatably connected to the lower control arm by a lower coupling. The spindle of this embodiment is attachable to a ground engaging component upon which the vehicle rides, and the rotation of the spindle is for steering the vehicle. In this embodiment upper and lower spindle protrusions extend from the spindle and each define spindle steering stops. Protrusions extend from the upper control arm and the lower control arm and define control arm steering stops. The upper spindle protrusion interacts with the upper control arm steering stop to restrict rotation of the spindle when the suspension system is in jounce, and the lower spindle protrusion interacts with the lower control arm steering stop to restrict rotation of the spindle when the suspension system is in rebound. Both spindle protrusions may engage with their respective control arm steering stops throughout the travel range of the suspension system in various embodiments of the invention.

Another embodiment of the invention provides a suspension system for a vehicle that has an upper control arm operably connected to a frame of a vehicle, the upper control arm having a U-shaped perimeter when viewed from above. This embodiment also has a lower control arm operably connected to the frame and a spindle pivotably and rotatably connected to the upper control arm by an upper coupling and pivotably and rotatably connected to the lower control arm by a lower coupling. The upper coupling of this embodiment is within the U-shaped perimeter of the upper control arm.

Yet another embodiment of the invention provides a suspension system for a vehicle having an upper control arm operably connected to the frame of the vehicle, a lower control arm operably connected to the frame and a spindle pivotably and rotatably connected to the upper control arm by an upper coupling and pivotably and rotatably connected to the lower control arm by a lower coupling. The spindle of this embodiment also has an attachment point for attaching a ground engaging component upon which the vehicle rides. The aspect ratio of the spindle of this embodiment, defined as the distance between the lower coupling and the attachment point for the ground engaging component divided by the distance between the upper coupling and lower coupling, is greater than 1.0.

DETAILED DESCRIPTION OF EMBODIMENTS OF THE INVENTION

Several embodiments of the invention relate to an independent front suspension for a vehicle. In these embodiments a steering spindle is connected to a control arm or control arms via pivotable and rotatable couplings. Such a coupling could include an inner bearing race enclosed in a housing. The inner bearing race could be a bearing that is generally spherical that is housed within an outer bearing race. For the purposes of this patent, when the outer bearing race is attached to the control arm in a way that the outer bearing race is generally contained within the perimeter of the control arm, the coupling is referred to as a ball joint. Ball joints may be constructed by attaching the outer bearing race to the control arm by pressing the outer bearing race into a socket formed in the control arm and having it be retained therein by friction, a snap-ring, a retaining plate and threaded fasteners, welding, or other methods known in the art. A ball joint may also be formed by integrally forming the outer bearing race within the control arm and other methods known in the art.

Another type of pivotable and rotatable coupling is a rod end bearing. Rod end bearings also have an inner bearing race within an outer bearing race or socket. In the case of a rod end bearing, the outer bearing race is attached to a threaded rod that is attached to a threaded extension from the control arm. Other pivotable and rotatable couplings will occur to those of ordinary skill in the art upon review of this disclosure and are encompassed within the scope of this patent.

Several embodiment of this invention include a spindle, also called a steering spindle. The spindle connects the ground engaging component, typically a tire or a ski, to the control arm or arms of the suspension. In some vehicles, the spindle is connected to the ground engaging component at a point above the lower control arm. This is true of most wheeled vehicles. In other vehicles, for example snowmobiles, the spindle is connected to the ground engaging component or ski at a point below the lower control arm. In these vehicles the spindle is rotatably and pivotably coupled to the lower control arm, but in the prior art vehicles the spindle was configured to avoid interference with the lower control arm when rotated to steer the vehicle. Many of the spindles of these prior art vehicles were C-shaped or arced, so that they could connect to an upper control arm, a lower control arm, and a ground engaging component below the lower control arm and be rotated without interfering with the lower control arm.

Control arms may be pivoting links between a vehicle chassis or frame and a steering spindle. The control arms may be directly coupled to a steering spindle or coupled to a spindle housing that contains the spindle. Common independent front suspension systems include two control arms, an upper control arm and a lower control arm.

Figure 1:
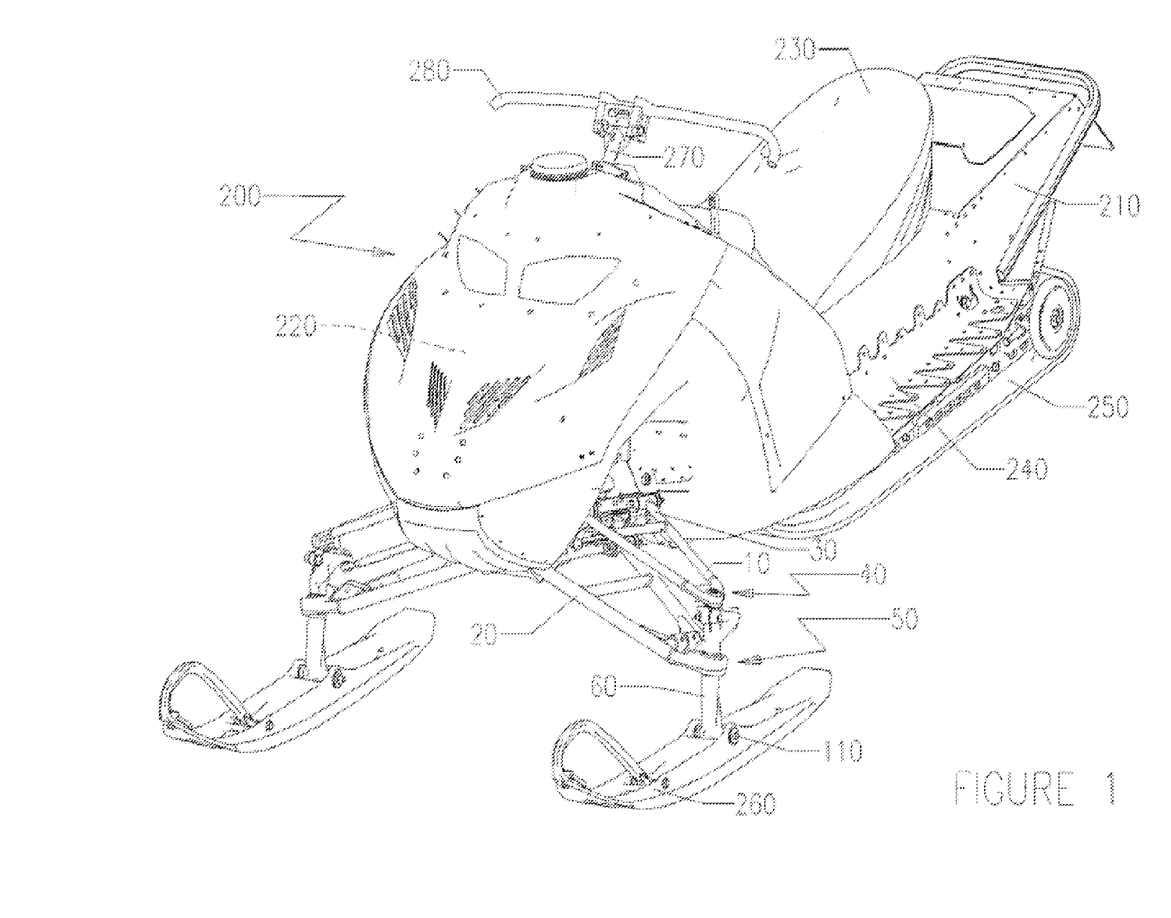
FIG. 1 is a perspective view of a vehicle of an embodiment of the invention.

Turning now to the Figures, FIG. 1 is a perspective view of an embodiment of a vehicle according to an embodiment of the invention. In the embodiment shown in FIG. 1 vehicle 200 is a snowmobile. Generally vehicle 200 includes a longitudinally extending chassis or frame 210. A vehicle chassis includes a vehicle's structural elements. These elements may be attached to an underlying frame. In vehicles with unitized or "unibody" construction, the chassis may essentially comprise the frame and include everything but the cosmetic body panels of the vehicle. For the purposes of this patent, the terms chassis and frame are interchangeable and refer to the structural elements of the vehicle. The chassis or frame 210 supports and mounts several vehicle components, including an engine 220 (beneath a hood), a straddle-type seat 230, running board 240, at least one drive element such as a drive track 250, and a pair of ground engaging components 260, in this case skis. The seat 230 is adapted to accommodate a rider in a straddle fashion, and the engine 220 powers the drive track 250 to propel the vehicle 200. A steering post 270 is operably connected to the pair of ground engaging components 260 and handlebars 280 to effect steering. Also shown in FIG. 1 is an upper control arm 10 of the independent front suspension, a lower control arm 20, a spindle 60, an upper coupling 40, and a lower coupling 50. The spindle 60 is connected to the ground engaging component 260 at attachment point 110.

Figure 2:
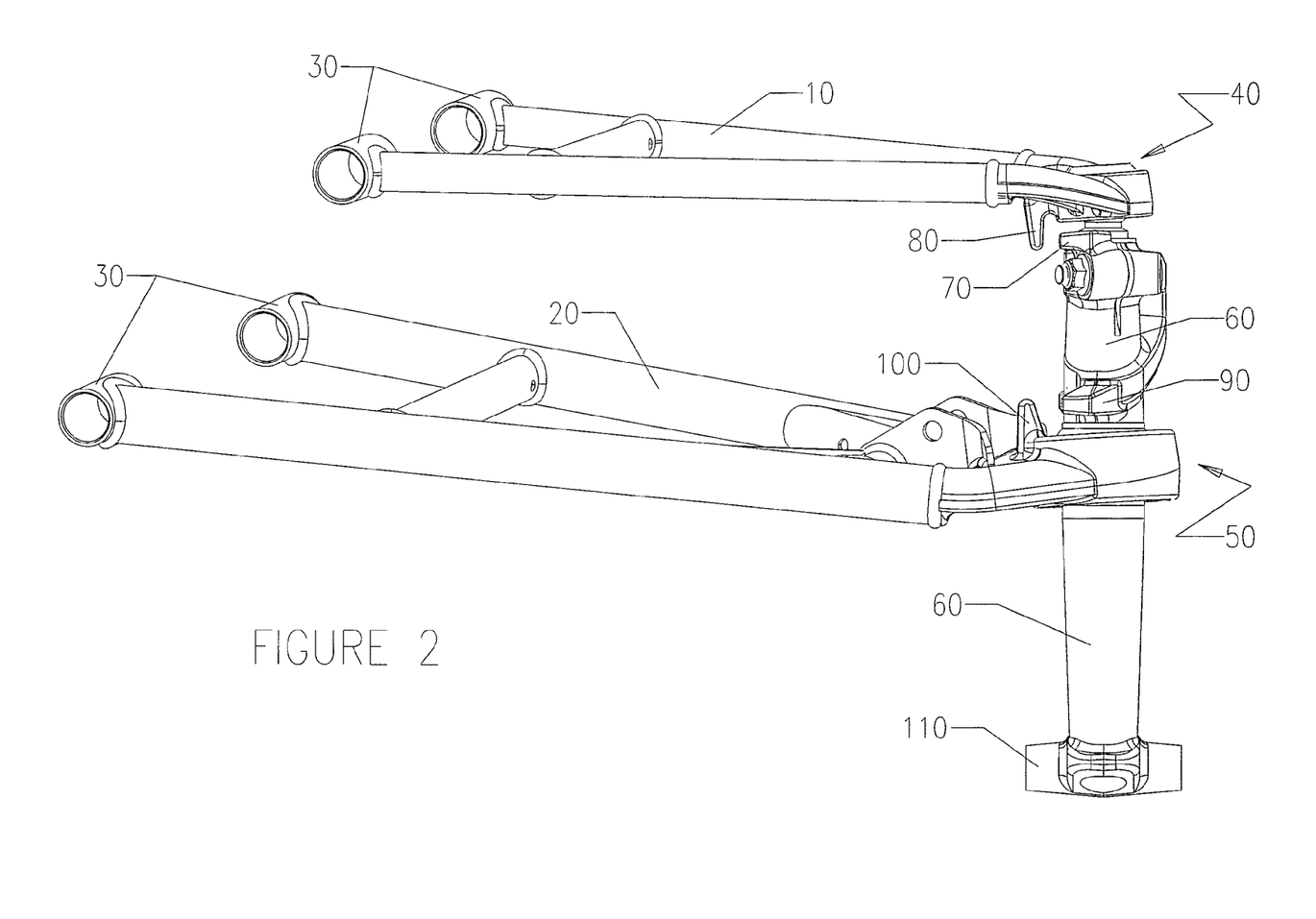
FIG. 2 is a perspective view of an embodiment of a suspension system in accordance with the invention.

FIG. 2 is a perspective view of an embodiment of a suspension system in accordance with the invention. The embodiment of FIG. 2 includes an upper control arm 10 and a lower control arm 20. The control arms of the embodiment of FIG. 2 are referred to as A-arms because they resemble the letter "A" when viewed from above. Thus the embodiment in FIG. 2 is commonly referred to as a double A arm suspension. The control arms are operably connected to the vehicle frame or chassis at connection points 30. The embodiment shown in FIG. 2 includes a generally straight and generally cylindrical spindle 60 that is pivotably and rotatably coupled to the upper control arm at upper coupling 40 and to the lower control arm at lower coupling 50. The embodiment in FIG. 2 also includes protrusions 80 extending from the upper control arm and protrusion 100 extending from the lower control arm. Protrusion 80 interacts with upper spindle protrusion 70 to restrict rotation of the spindle 60 when the suspension system is in full jounce. Lower spindle protrusion 90 interacts with the protrusion 100 to restrict rotation of the spindle 60 when the suspension system is in full rebound. Jounce is the condition where the spindle 60 is moved upward and rebound is a condition where the spindle 60 is moved downward relative to the vehicle. Upper spindle protrusion 70 may interact with upper protrusion 80 at other points during the suspension travel, and lower spindle protrusion 90 may interact with protrusion 100, but the above-described interaction is the primary steering stop when the suspension is in rebound or jounce as described.

Figure 3:
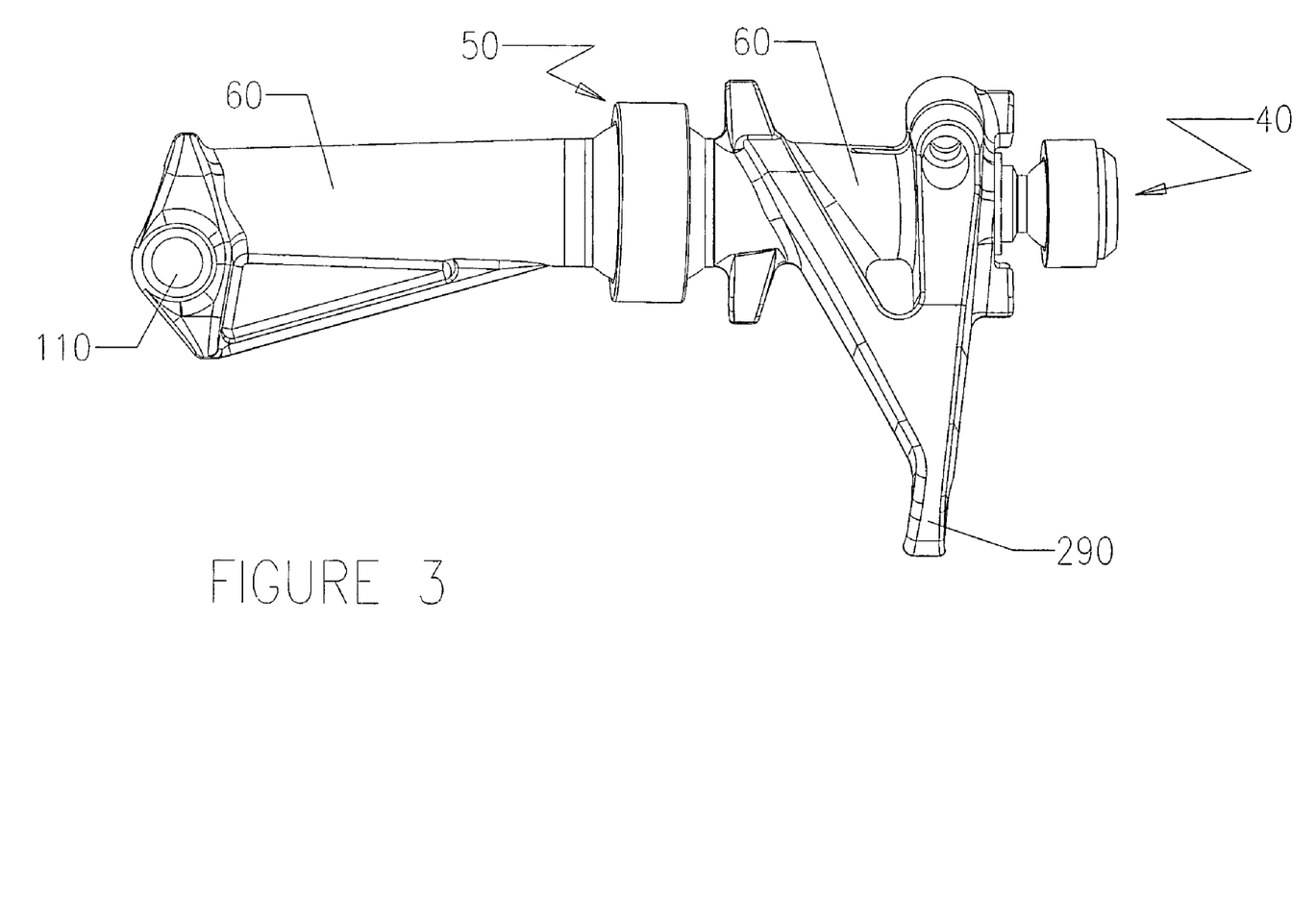
FIG. 3 is a side view of an embodiment of a spindle in accordance with an embodiment of the invention.

FIG. 3 is a side view of an embodiment of a spindle in accordance with an embodiment of the invention. A spindle 60 includes the upper coupling 40, a lower coupling 50, and a steering arm 290. The steering arm 290 may be operably connected to a steering post 270 (shown in FIG. 1) to allow steering of the vehicle 200 through rotation of the spindle 60.

Figure 4:
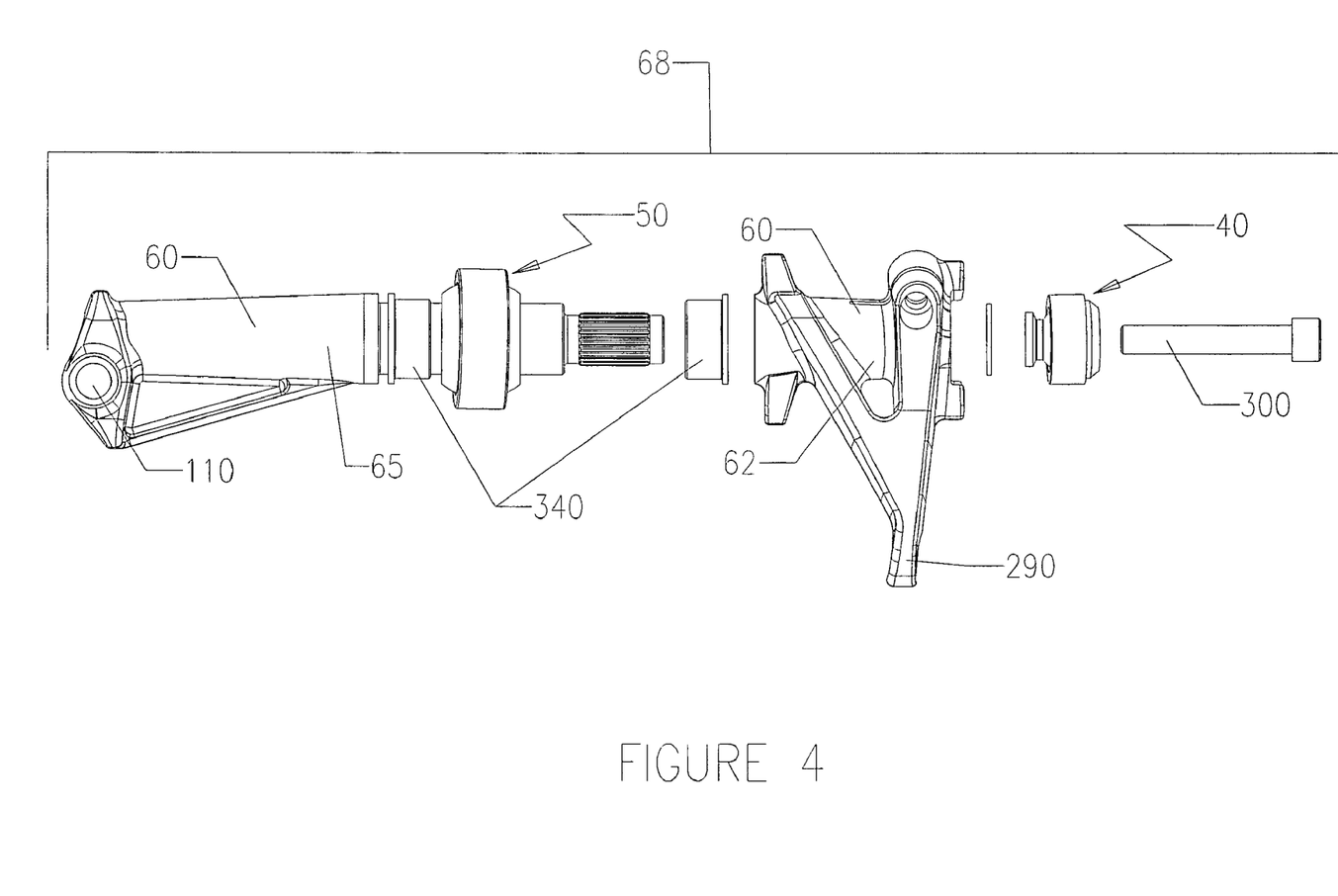
FIG. 4 is an exploded side view of an embodiment of a spindle in accordance with an embodiment of the invention.

FIG. 4 is an exploded side view of an embodiment of a spindle assembly in accordance with an embodiment of the invention. A spindle assembly 68 may include a spindle 60, steering arm 290, ground engaging element attachment point 110, and/or other components. The spindle 60 of this embodiment is constructed of an upper spindle 62 and a lower spindle 65. A fastener 300 secures the upper coupling 40 and the upper spindle 62 to the lower spindle 65 and the lower coupling 50. Thrust bearings 340 are also held in place by fastener 300 and become a part of lower coupling 50. This embodiment of the spindle is essentially split into an upper and lower spindle with the upper coupling 40 fastened to the upper spindle 62 by the fastener 300. Other possible embodiments for constructing the spindle include a two piece coaxial design, a two piece design split in or at the lower coupling 50 and other designs which will occur to one skilled in the art upon reading this disclosure.

Figure 5:
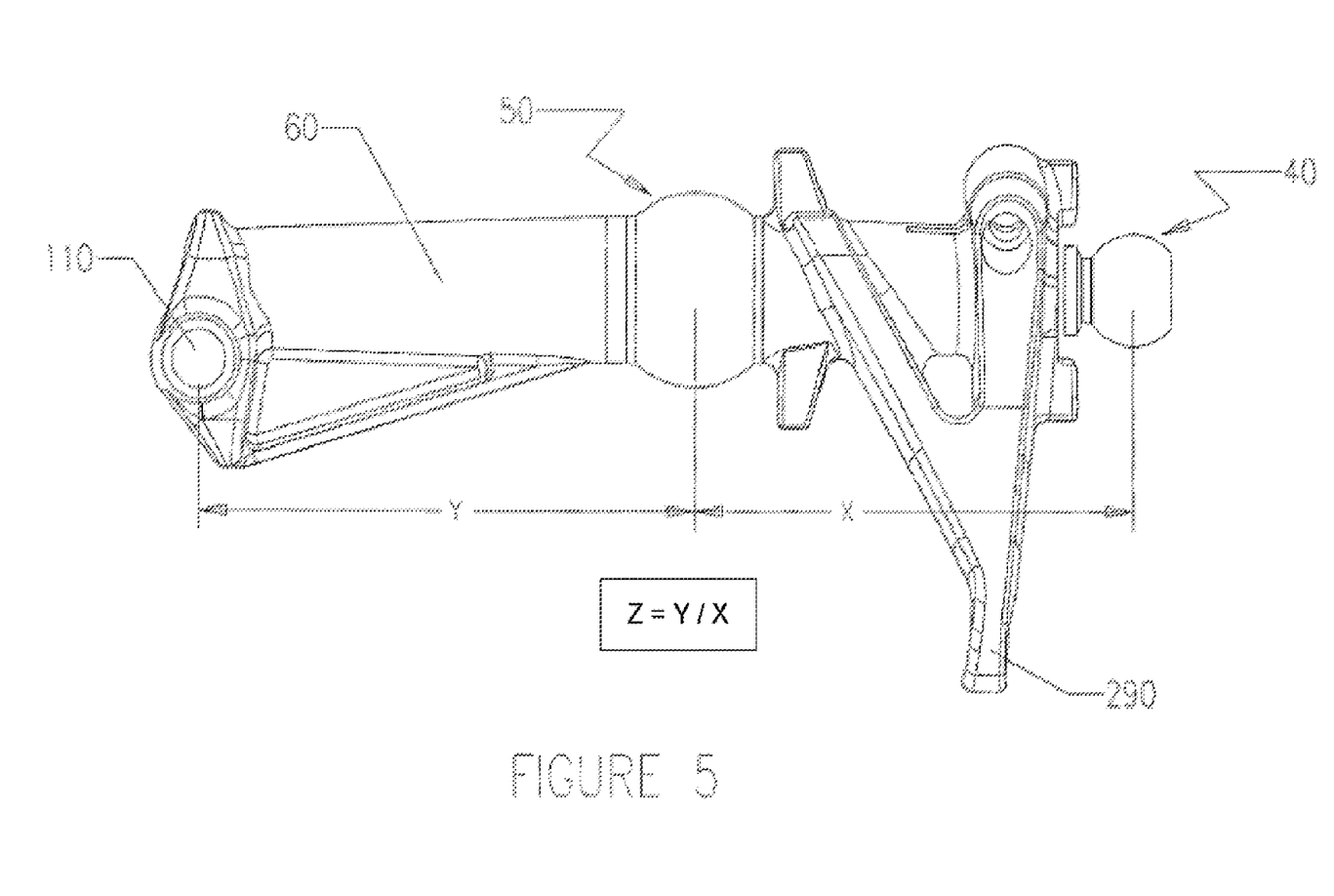
FIG. 5 is a side view of an embodiment of a spindle in accordance with an embodiment of the invention.

FIG. 5 is a side view of an embodiment of a spindle in accordance with an embodiment of the invention. Portions of the upper coupling 40 and lower coupling 50 have been removed in this drawing of this embodiment. A distance from the centerline of the upper coupling 40 to the centerline of the lower coupling 50 is indicated on the Figure as "X." The distance from the lower coupling 50 to the attachment point 110 for the ground engaging component is indicated as "Y." The aspect ratio of a spindle is defined as the distance between the lower coupling 50 and the ground engaging component attachment point 110 divided by the distance between the upper coupling 40 and the lower coupling 50. The aspect ratio is indicated in FIG. 5 as ration Z=Y/X. In the case of the spindle shown in FIG. 5 the distance X is 5.128 inches and Y is 5.785 inches so the aspect ratio Z is 1.13 (5.785^5.128). This aspect ratio is achievable in part because the spindle 60 passes through the lower coupling 50 rather than going around the lower coupling 50. The generally straight nature of the spindle of this embodiment allows for higher aspect ratios by eliminating the bending moment induced by the vertical load when the spindle must be configured to go around the lower control arm as in prior art spindle designs that are not generally straight. A spindle shown as in FIG. 5 is merely an exemplary embodiment of spindles in accordance with the invention and the aspect ratio is also merely exemplary. In other embodiments of the suspension system, the aspect ratio of the spindle is greater than 1.2, greater than 1.5, greater than 1.8, and greater than 2.0.

The generally straight spindle of embodiments of the invention may have the following advantages, among others. First, the higher aspect ratio that may be achievable in some embodiments of the invention allows for the lower coupling to be closer to the upper coupling. This may allow for more ground clearance for the vehicle. Also, this may allow for a more horizontal lower control arm that may enable greater suspension travel since the travel of the coupling is not limited by a significant angle between the spindle and the lower control arm. Since some embodiments of the invention may require the spindle to pass through the lower control arm, and since some of those embodiments may use a larger lower coupling to allow this configuration, these embodiments may have greater travel and/or joint strength in part because of the larger lower coupling. Some embodiments may also or alternatively use generally cylindrical spindles that may have other advantages, including for example, improved snowmobility or reduced resistance from snow when used on a snowmobile.

Figure 6:
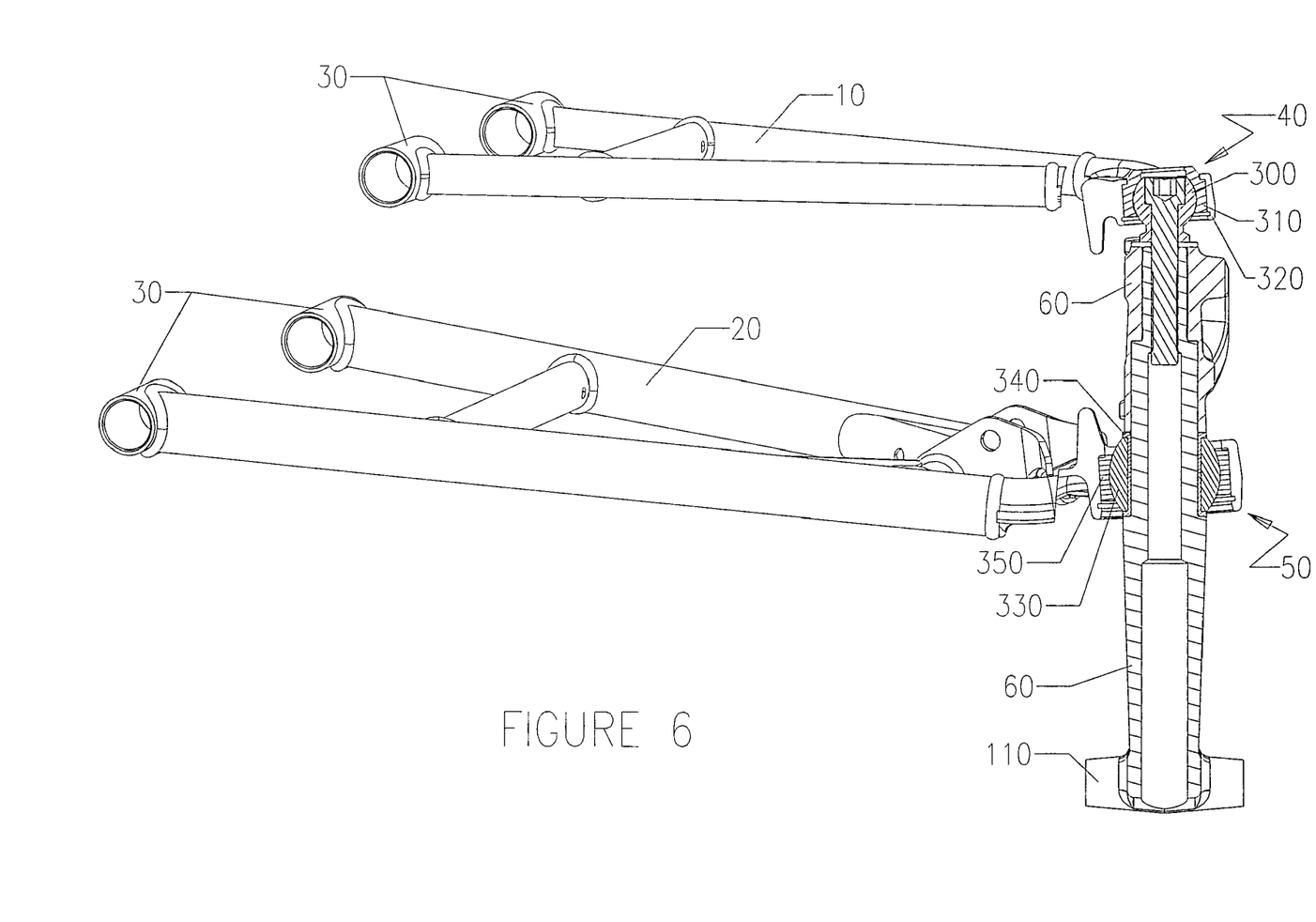
FIG. 6 is a perspective view of an embodiment of a suspension system according to an embodiment of the invention with a partial cross section.

FIG. 6 is a perspective view of an embodiment of a suspension system according to an embodiment of the invention with a partial cross section. Upper control arm 10 and lower control arm 20 are connected to spindle 60 at upper coupling 40 and lower coupling 50 respectively. In this embodiment upper coupling 40 includes inner bearing race or bearing portion 300 and outer bearing race or bearing portion 310 enclosed in upper control arm housing 320. In this embodiment the outer bearing portion 310 is pressed into the upper control arm housing 320. The outer bearing portion 310 could be secured to the upper control arm housing 320 by any means known in the art, including being integrally formed with the upper control arm housing 320. In this embodiment upper coupling 40 will allow spindle 60 to both rotate within and pivot within coupling 40 as upper inner bearing race 300 rotates within upper outer bearing portion 310. Lower coupling 50 includes lower inner bearing race or bearing portion 330, lower thrust bearing 340 and lower outer bearing race or bearing portion 350. In one embodiment the spindle 60 can rotate within thrust bearing 340 to allow the spindle to rotate within lower coupling 50. Additionally lower inner bearing portion 330 can pivot within lower outer bearing portion 350 to allow spindle 60 to pivot within lower coupling 50. In this embodiment the rotation of spindle 60 primarily occurs within the thrust bearing 340 and the pivoting of spindle 60 primarily occurs between inner bearing portion 330 and outer bearing portion 350. In an alternative embodiment of the lower coupling 50, thrust bearing 340 can be permanently affixed to spindle 60. In this embodiment both the rotation and pivoting of spindle 60 within lower coupling 50 is accomplished by inner bearing portion 330 moving within outer bearing portion 350. In yet another embodiment, thrust bearing 340 need not be used at all or may be integrally formed or machined with or from spindle 60. In these embodiments, both the rotation and pivoting of spindle 60 within lower coupling 50 is accomplished by inner bearing portion 330 moving within outer bearing portion 350.

Figure 7:
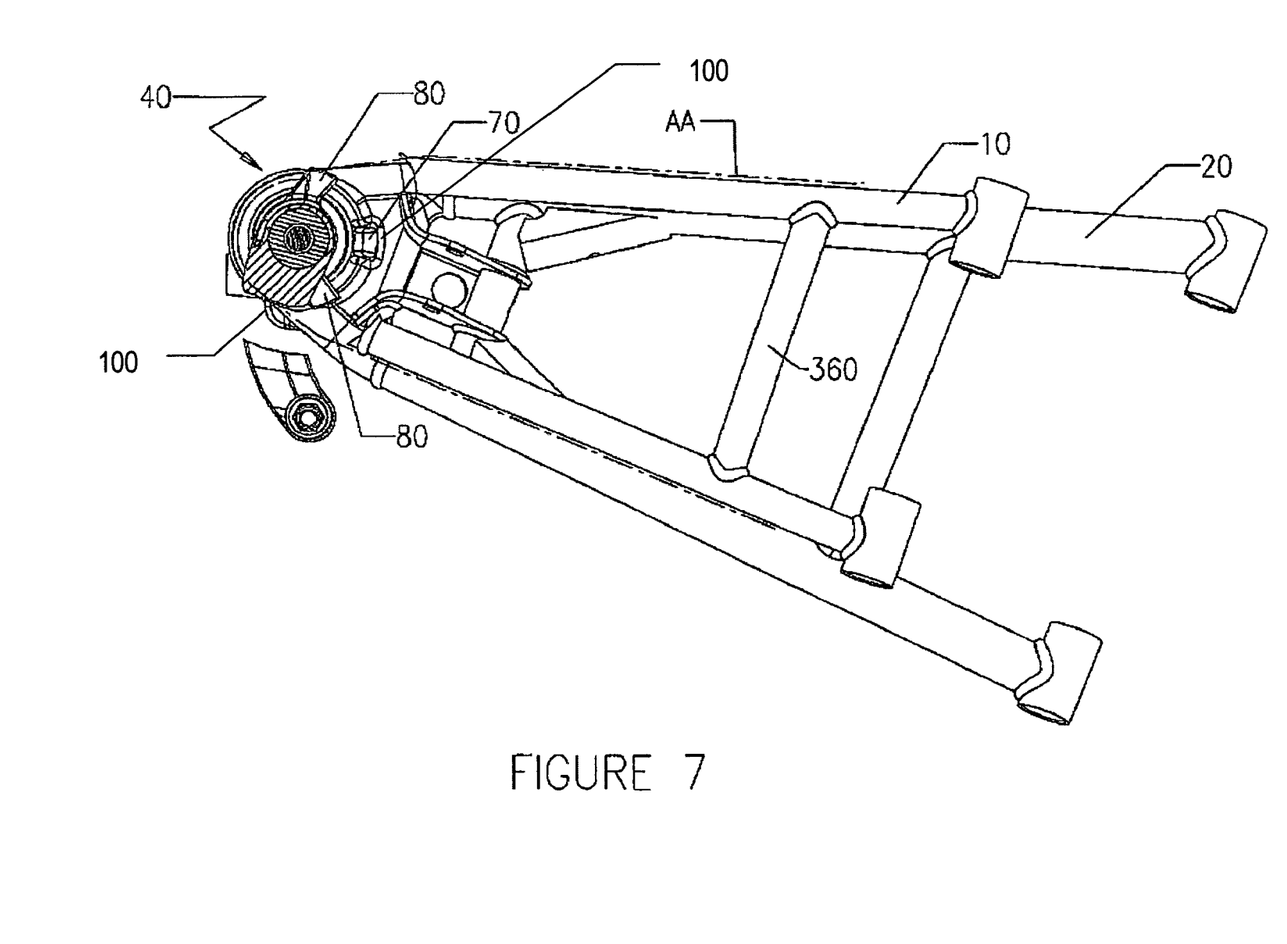
FIG. 7 is a plan view of an embodiment of a suspension system of an embodiment of the invention.

FIG. 7 is a plan view of an embodiment of a suspension system of an embodiment of the invention. The view is of this embodiment from the perspective from above the vehicle. This embodiment has an upper control arm 10, a lower control arm 20, and an upper coupling 40. The upper control arm has a U-shaped perimeter when viewed from above that is generally described by broken line AA. Upper coupling 40 is within the perimeter of the U-shaped upper control arm. The upper control arm of this embodiment is commonly referred to as an A-arm, since the U-shaped perimeter in combination with cross member 360 generally resembles an upper case letter "A." Having the upper coupling 40 within the upper control arm perimeter AA may provide a stronger upper coupling and suspension system by eliminating cantilevered construction wherein the upper coupling is outside of the upper control arm perimeter and attached to the upper control arm by an extended member. The illustrated embodiment of the invention also includes more than one protrusion 80 extending from upper control arm 10.

While preferred embodiments of the present invention have been described, it should be understood that various changes, adaptations and modifications may be made therein without departing from the spirit of the invention and the scope of the appended claims.

What is claimed is:

1. A suspension system for a vehicle, comprising:
   a. an upper control arm connected to a frame of a vehicle;
   b. a lower control arm connected to the frame;
   c. a rotatable steering spindle, the spindle attachable to a ground engaging component upon which the vehicle rides, the rotation of the steering spindle for steering the vehicle;
   d. an upper coupling that pivotably and rotatably connects the spindle to the upper control arm;
   e. a lower coupling that pivotably and rotatably connects the spindle to the lower control arm, the spindle passing through the lower coupling.

2. The suspension system of claim 1, wherein the lower coupling comprises a ball joint having a inner bearing portion and an outer bearing portion and the spindle passes through the inner bearing portion and is rotatable and pivotable within the lower coupling.

3. The suspension system of claim 1, wherein the upper control arm has a U-shaped perimeter when viewed from above, and further wherein the upper coupling is within the U-shaped perimeter of the upper control arm.

4. The suspension system of claim 3, wherein the upper coupling is a ball joint.

5. The suspension system of claim 1, wherein the upper coupling is a ball joint.

6. The suspension system of claim 1, wherein the lower coupling is a ball joint.

7. The suspension system of claim 1, wherein the spindle is generally cylindrical.

8. The suspension system of claim 1, wherein the spindle is generally straight.

9. The suspension system of claim 1, wherein the spindle further comprises an attachment point for attaching a ground engaging component upon which the vehicle rides, and wherein an aspect ratio of the spindle, defined as the distance between the lower coupling and the attachment point divided by the distance between the upper coupling and lower coupling, is greater than 1.0.

10. The suspension system of claim 9, wherein the aspect ratio is greater than 1.5.

11. A suspension system for a vehicle, comprising:
 a. an upper control arm operably connected to a frame of the vehicle;
 b. a lower control arm operably connected to a frame of the vehicle;
 c. a spindle pivotably and rotatably connected to the upper control arm by an upper coupling and pivotably and rotatably connected to the lower control arm by a lower coupling, the spindle attachable to a ground engaging component upon which the vehicle rides, the rotation of the spindle for steering the vehicle;
 d. upper and lower spindle protrusions extending from the spindle that each define spindle steering stops;
 e. protrusions extending from the upper control arm and the lower control arm that define control arm steering stops, the upper spindle protrusion interacting with the upper control arm steering stop to restrict rotation of the spindle when the suspension system is in jounce, the lower spindle protrusion interacting with the lower control arm steering stop to restrict rotation of the spindle when the suspension system is in rebound.

12. The suspension system of claim 11, wherein at least one of the upper control arm and the lower control arm includes a second protrusion defining a steering stop.

13. The suspension system of claim 11, wherein the spindle passes through the lower coupling.

14. The suspension system of claim 11, wherein the upper control arm has a U-shaped perimeter when viewed from above, and further wherein the upper coupling is within the U-shaped perimeter of the upper control arm.

15. The suspension system of claim 11, wherein the spindle is generally cylindrical.

16. A suspension system for a vehicle comprising:
 a. an upper control arm operably connected to a frame of a vehicle, the upper control arm having a U-shaped perimeter when viewed from above;
 b. a lower control arm operably connected to the frame;
 c. a spindle pivotably and rotatably connected to the upper control arm by an upper coupling and pivotably and rotatably connected to the lower control arm by a lower coupling, wherein the upper coupling is within the U-shaped perimeter of the upper control arm.

17. The suspension system of claim 16, wherein the spindle passes through the lower coupling.

18. The suspension system of claim 16, wherein the spindle is generally cylindrical.

19. The suspension system of claim 16, wherein the spindle is generally straight.

20. The suspension system of claim 16, wherein the perimeter is defined by a framework forming the upper control arm.

21. The suspension system of claim 16, wherein the spindle further comprises an attachment point for attaching a ground engaging component upon which the vehicle rides, and wherein the aspect ratio, defined as the distance between the lower coupling and the attachment point divided by the distance between the upper coupling and lower coupling, is greater than 1.0.

22. A suspension system for a vehicle, comprising:
 a. an upper control arm operably connected to a frame of a vehicle;
 b. a lower control arm operably connected to the frame;
 c. a spindle pivotably and rotatably connected to the upper control arm by an upper coupling and pivotably and rotatably connected to the lower control arm by a lower coupling, the spindle passing through the lower coupling;
 d. an attachment point on the spindle for attaching a ground engaging component upon which the vehicle rides, wherein the aspect ratio of the spindle, defined as the distance between the lower coupling and the attachment point divided by the distance between the upper coupling and lower coupling is greater than 1.0.

23. The suspension system of claim 22, wherein the aspect ratio of the spindle is greater than 1.2.

24. The suspension system of claim 22, wherein the aspect ratio of the spindle is greater than 1.5.

25. The suspension system of claim 22, wherein the aspect ratio of the spindle is greater than 1.8.

26. The suspension system of claim 22, wherein the aspect ratio of the spindle is greater than 2.0.

* * * * *